(12) United States Patent
Carazzone

(10) Patent No.: US 7,808,420 B2
(45) Date of Patent: Oct. 5, 2010

(54) ELECTROMAGNETIC IMAGING BY FOUR DIMENSIONAL PARALLEL COMPUTING

(75) Inventor: James J. Carazzone, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 101 days.

(21) Appl. No.: 12/438,525

(22) PCT Filed: Oct. 25, 2007

(86) PCT No.: PCT/US2007/022606

§ 371 (c)(1),
(2), (4) Date: Feb. 23, 2009

(87) PCT Pub. No.: WO2008/066628

PCT Pub. Date: Jun. 5, 2008

(65) Prior Publication Data

US 2010/0224362 A1    Sep. 9, 2010

Related U.S. Application Data

(60) Provisional application No. 60/861,785, filed on Nov. 30, 2006.

(51) Int. Cl.
G06F 19/00    (2006.01)
(52) U.S. Cl. .......................... 342/6; 342/179
(58) Field of Classification Search ............... 702/6–7
See application file for complete search history.

(56) References Cited

U.S. PATENT DOCUMENTS

| | | | |
|---|---|---|---|
| 6,115,670 A | 9/2000 | Druskin et al. | 702/7 |
| 6,603,313 B1 | 8/2003 | Srnka | 324/354 |
| 7,333,893 B2 | 2/2008 | Burtz et al. | 702/7 |
| 2003/0200063 A1 | 10/2003 | Niu et al. | 703/2 |
| 2003/0203613 A1 | 10/2003 | Houston | 438/618 |
| 2006/0047430 A1 | 3/2006 | Edwards | 702/6 |
| 2006/0217889 A1* | 9/2006 | Burtz et al. | 702/7 |

FOREIGN PATENT DOCUMENTS

WO    WO2007/102973    9/2007

OTHER PUBLICATIONS

Newman, G. A. et al. (1997) "Three-Dimensional Massively Parallel Electromagnetic Inversion 1," *Geophysics Journal International*, 128, pp. 345-354.
European Standard Search Report dated Mar. 7, 2007, 1 page.
PCT International Search and Written Opinion dated Apr. 24, 2008, 7 pages.

* cited by examiner

*Primary Examiner*—Thomas H Tarcza
*Assistant Examiner*—Timothy A Brainard
(74) *Attorney, Agent, or Firm*—ExxonMobil Upstream Research Co. Law Dept.

(57) ABSTRACT

Method for organizing computer operations on a system of parallel processors to invert electromagnetic field data (11) from a controlled-source electromagnetic survey of a subsurface region to estimate resistivity structure (12) within the subsurface region. Each data processor in a bank of processors simultaneously solves Maxwell's equations (13) for its assigned geometrical subset of the data volume (14). Other computer banks are simultaneously doing the same thing for data associated with a different source frequency, position or orientation, providing a "fourth dimension" parallelism, where the fourth dimension requires minimal data passing (15). In preferred embodiments, a time limit is set after which all processor calculations are terminated, whether or not convergence has been reached.

18 Claims, 2 Drawing Sheets

ELECTROMAGNETIC IMAGING BY FOUR DIMENSIONAL PARALLEL COMPUTING

This application is a National Stage entry under 35 U.S.C. 371 of PCT/US2007/022606 that published as WO 2008/066628 and was filed on Oct. 25, 2007 and claims the benefit of now expired U.S. Provisional application 60/861,785 which was filed on Nov. 30, 2006.

This invention relates generally to the field of geophysical prospecting and, more particularly, to controlled source electromagnetic ("CSEM") surveying. Specifically, the invention is a method for rapid computer modeling (i.e., solving for EM fields) and inversion (i.e., inferring resistivity structure, given measured EM field data) of Maxwell's equations in three dimensions ("3D") by means of the effective parallel utilization of many central processing units ("CPUs") applied to marine controlled source electromagnetic ("MCSEM") data collected with the objective of identifying hydrocarbons in the subsurface.

BACKGROUND OF THE INVENTION

Maxwell's equations are a system of partial differential equations in 3D that connect the electric and magnetic fields observed either in the vacuum or in actual materials (such as seawater and subsurface rocks) resulting from applied electric or magnetic charges and currents. For completeness, it may be noted that the fundamental magnetic charge (the so-called magnetic monopole) does not actually exist in nature, unlike the fundamental electric charge, however, Maxwell's equations provide a mathematical description of the effects magnetic monopole charges would generate if they existed. The sources or generators of electric or magnetic currents are called transmitters. Electric and magnetic fields are vector quantities in the sense that they possess both magnitude (length) and direction in 3D. They are typically described mathematically in terms of their components along each of the three orthogonal directions of an agreed upon Cartesian coordinate system for which all directions are oriented with respect to the other two directions according to a right-hand rule. Such systems are referred to as right-hand systems. In general, the applied transmitter currents vary with time in which case the electric and magnetic fields are coupled to each other and will also vary with time even if the properties of the medium do not vary. The special cases of static applied electric or magnetic charge distributions in a static medium are referred to as electrostatics and magnetostatics. In the static cases, electric and magnetic fields are not coupled to each other mathematically by Maxwell's equations. When the applied time varying electric and magnetic currents are rich in only certain frequency components, Maxwell's equations may be usefully transformed to the frequency domain by application of the Fourier transform. In the frequency domain, the electric and magnetic fields become complex quantities which depend upon the frequency as well as upon the locations and directions of the applied electric and magnetic currents and upon the location of the point (in 3D) at which the fields are measured.

As applied to hydrocarbon exploration, electromagnetic measurements made from the surface or from the near ocean bottom with time varying applied electric current sources can be used, under favorable conditions, to reveal information about subsurface resistive structures. The property or ability of a unit volume of material to conduct electricity is measured in Siemens per meter (S/m). The ability of a particular sample to conduct a flow of electric current along a particular direction is proportional to the surface area provided by the sample to the electric current flow and is inversely proportional to the length of the sample along the current flow direction. Resistivity is the reciprocal of conductivity and is measured in ohm-meters. Thus the previous statement can be recognized as the familiar rule of circuits for resistors wired in parallel. Resistivity information can be of great value in prospecting for hydrocarbons in many important locations because oil and/or gas saturated reservoirs often exhibit strong contrasts in resistivity compared to surrounding brine filled rock structures. This is particularly true of clastic rock materials which are overwhelmingly composed of sandstones, silts and shale. In such situations, sandstone units, which are relatively porous, provide the reservoir materials. Reservoir fluid saturations comprise all possible mixtures of brine, fresh water, gas and oil; all displaying relatively predictable resistivity properties (based on the volume fraction) with highly oil saturated reservoir materials exhibiting resistivities as high as 1000 ohm-m. In contrast, brine filled rocks have resistivities in the range of 1 ohm-m. In addition, the deepwater marine situation is particularly favorable for CSEM technology because of the follow reasons:

1. Deepwater exploration wells are extremely expensive (10 to 30 million USD), making additional subsurface information concerning the presence (or absence) of commercially exploitable hydrocarbons of great commercial value.

2. Seawater, which is highly conductive (~5 S/m), provides excellent coupling to the transmitting generators and receiving detectors.

3. The sea bottom in deepwater situations (determined by the frequency of the applied current), provides excellent screening of electromagnetic signals which would otherwise act as sources of noise.

4. The air to water interface, being an interface between the non-conductive air (conductivity ~$10^{-10}$ S/m) and relatively conductive seawater, acts to reflect electromagnetic energy radiated upward by the transmitting generator back downward towards the targets of interest, effectively doubling the transmitter efficiency.

To be of practical value in hydrocarbon exploration relatively inexpensive measurements made at the surface or ocean bottom must usefully constrain subsurface resistivity features in a manner that assists in reducing exploration risk. This is an inverse problem in which the electromagnetic data are used to determine valuable aspects of the subsurface resistivities in a process typically called data inversion. In general one or both of the following two procedures are used.

1. Human guided, by-hand adjustment of the 3D resistivity model is used until a sufficiently good match is obtained between relevant aspects of measured and synthesized electromagnetic data. This process usually begins with a relatively sophisticated subsurface model based upon an interpretation made with conventional seismic data together with an hypothesis for converting seismic attributes, such as amplitude, to predictions of resistivity. Obviously this procedure benefits from actual well measurements of resistivity which can be usefully extrapolated into the area of interest. This approach also relies upon the ability to simulate solutions of Maxwell's equations in realistic situations. The term simulate in this context—sometimes called forward modeling—means to solve Maxwell's equations by numerical methods for one or more electromagnetic field components, using assumed resistivity values as a function of position throughout the region of interest (the resistivity model). (Analytical solutions exist for Maxwell's equations only for the simplest resistivity models.) Realistic situations will typically present 3D geometry, likely including variations in water bottom topography and resistivity. Since MCSEM data are typically collected with generating transmitters located about 50 m above the water bottom, and with detectors located on the water bottom, sea bottom changes in resistivity can have significant effects upon the actual measured electromagnetic fields.

2. Inversion procedures that can be fully automated in which an appropriate mathematical measure of the misfit difference between measured and processed actual CSEM data is reduced by a numerical optimization procedure that adjusts subsurface resistivities (or equivalently conductivities) and possibly other important parameters (such as applied current magnitudes or phase) until the misfit difference is reduced to a sufficiently small value (relative to the expected noise level in the measured and processed data and relative to the expected noise level expected in the simulated data as well). It should be noted that all actual 3D CSEM datasets are insufficient to uniquely determine subsurface resistivities in a strict mathematical sense even on reasonable distance scales in portions of the subsurface that are well illuminated by the transmitting generators. In all cases, inverted resistivity models represent a few of the many possible realizations of actual resistivity distributions in the real earth. These inverted models produce simulations that resemble to a greater or lesser extent the measured and processed data. Thus, non-uniqueness and the need for expert interpretation remain significant issues. However, inversion studies of CSEM data can clearly reduce real world hydrocarbon exploration risks, particularly when combined with other forms of geophysical data. Inversion procedures applied to Maxwell's equations require cycles of simulation and back propagation amounting to hundreds of re-simulations of the measured and processed data. Back propagation refers to a mathematical procedure which produces a computationally efficient means of computing the derivatives of the inversion misfit error with respect to the model resistivities or conductivities. Derivative information of this kind is used by the automatic optimization process to reduce the misfit error.

Both of the methodologies outlined above for inverting MCSEM survey data to estimate subsurface resistivity structure for hydrocarbon exploration require repeated solution of Maxwell's equations in 3D. This is a formidable computational undertaking requiring the best possible computer implementation. As will be explained below, the present invention arranges the solution and back projection computations in such a manner that processing units can be organized in a manner that efficiently allows extremely large number of processing units to be effectively deployed. Previously reported solution schemes (see, for example, Newman and Alumbaugh, "Three-dimensional massively parallel electromagnetic inversion 1," *Geophysics Journal International* 128, 345-354 (1997)) allow the use of multiple processing units by assigning regions of the modeling domain to the processing units based upon mapping the 3D resistivity or conductivity model on to the available processors organized into a 3D mesh. Thus, a 3D resistivity or conductivity model composed of 200 cells along the X, Y, Z Cartesian directions (a volume of $200^3$ cells) might be mapped onto $4 \times 4 \times 4 = 64$ processing units by assigning $200/4 = 50$ cells to each task along each of X,Y,Z. Solution of Maxwell's equations will in general involve solution of an algebraic system of equations obtained by the application of an appropriate discretization rule to the underlying system of partial differential equations. When using a parallel implementation, solution methods are preferably selected that lend themselves naturally to parallel implementations. Consider the case in which the magnetic fields are eliminated from Maxwell's equations in favor of the electric fields. This is acceptable provided that one is interested in the case of applied electric and magnetic currents which vary in time (the non-DC case). (It may be recalled that for DC sources which are governed by electrostatics and magnetostatics, the electric and magnetic fields are not coupled). The resulting equations involve second order partial derivatives with respect to the three Cartesian coordinates X,Y,Z. Within a second order finite difference scheme, one obtains a system of algebraic equations for the electric fields along the cell edges due to the applied electric currents, $$Ke = j$$

where K is a square matrix of rank equal to three times the total number of cells ($200^3$ for example). This is the number of electric field unknowns because the electric field is a vector with three components. The unknown electric fields are organized into a column vector (e in the above equation) of length three times the number of cells. The right hand side (j in the above equation), again is a column vector of length three times the number of cells and represents the electric currents created by the generating transmitters. Fortunately the matrix K has zero elements almost everywhere. The non-zero entries can be contained within 13 column vectors of length three times the number of cells. This compact representation also requires a set of index vectors of the same size to map back and forth between the original elements of K and the compactly stored non-zero values. Solutions for the electric fields can be obtained by an iterative solution method which involves repeated multiplication of K by residual vectors constructed from the difference between K applied to the solution for the current iteration and the right hand side of the above equation. These solution procedures lend themselves to parallel implementation because, when applied in a framework where the original 3D modeling domain has been assigned to, for example $4^3 = 64$ separate processing tasks, each task has only $50^3$ cells assigned to it, and multiplication of K by the residual vectors involves communication of only data along the domain boundaries (this is surface data along the faces of $50^2$ cells in the example).

SUMMARY OF THE INVENTION

In one embodiment, the invention is a method for organizing a plurality of computer processors into a system of parallel processors to invert measured electromagnetic field data from a controlled-source electromagnetic survey of a subsurface region to estimate resistivity structure within the subsurface region, comprising:

(a) decomposing the measured data into frequency components, and developing an assumed resistivity model of the subsurface region;

(b) arraying computer processors into N banks, each bank containing a plurality of processors, including communication between processors and between banks;

(c) programming the processors in each bank to solve Maxwell's equations in parallel by an iterative numerical method for solving partial differential equations, each processor solving over a different portion of the volume of the subsurface region;

(d) inputting to each bank a different slice of the measured data, a different slice being denoted by a different electromagnetic field component, frequency or electromagnetic source location;

(e) partitioning the resistivity model into partial volumes equal in number to the number of processors in a bank and inputting a different partial volume into each processor, and repeating for each bank;

(f) solving Maxwell's equations by parallel computation within each bank, thereby simulating theoretical electromagnetic data corresponding to the assumed resistivity model and to the source frequency, location and field component corresponding to the measured data slice associated with the bank, each bank simulating solutions corresponding to different data slices of measured data by parallel computation between banks; and (g) comparing the simulated data to the measured data, and adjusting the model to reduce the difference.

Thus, the inventive method simultaneously employs both data parallelization and parallelization of the numerical solution of Maxwell's electromagnetic field equations. With a sufficient number of processors, all data slices may be inverted simultaneously in a process that infers the resistivity structure of the subsurface region that generated the electromagnetic data.

BRIEF DESCRIPTION OF THE DRAWINGS

The present invention and its advantages will be better understood by referring to the following detailed description and the attached drawing in which.

Figure 1:
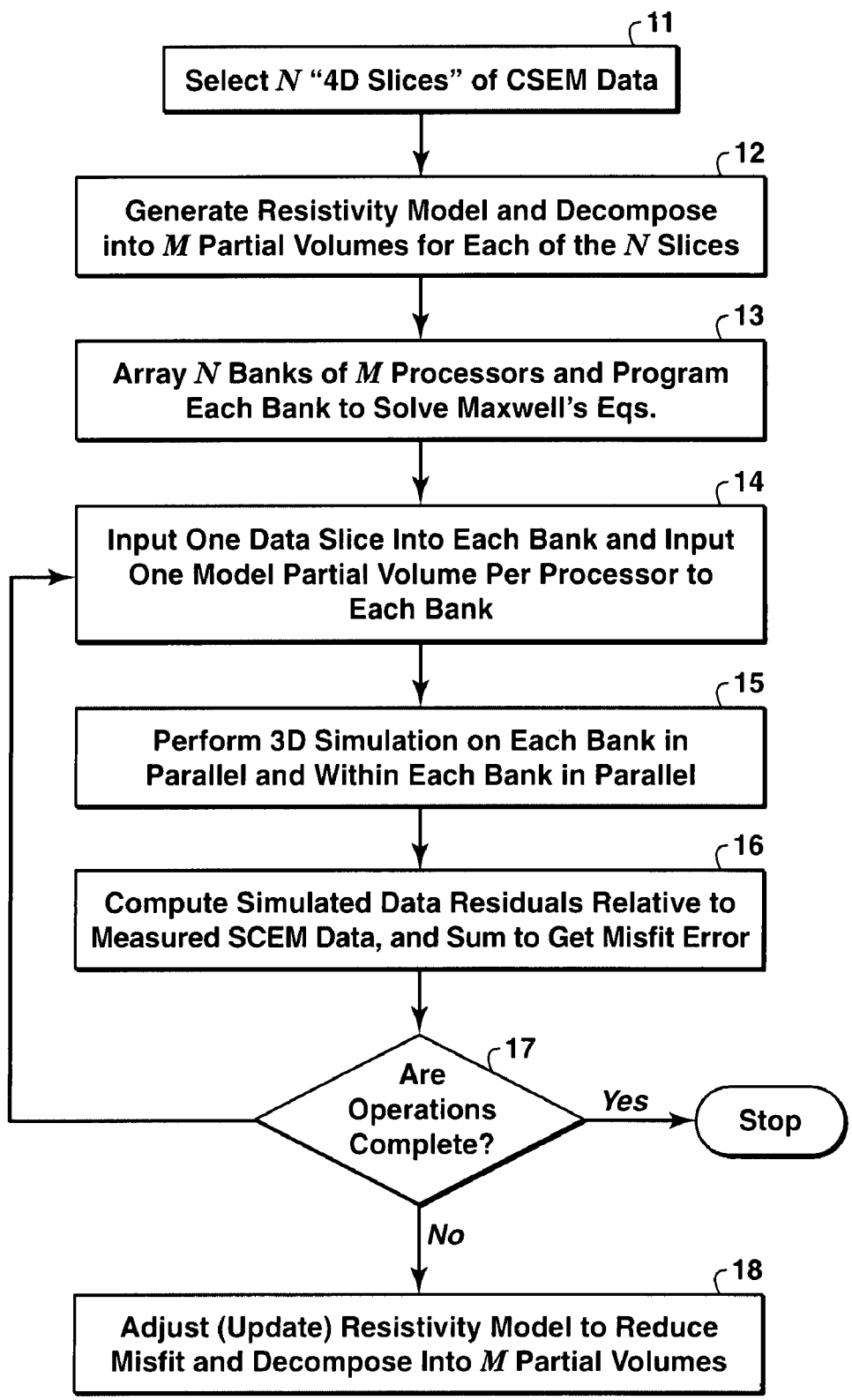
FIG. 1 is a flow chart showing basic steps in one embodiment of the present inventive method.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

Parallel implementations of iterative solvers achieve satisfactory results for the solution of Maxwell's equations when used on systems running up to a few hundred CPU's in parallel on the best available communications networks. Less advanced communications networks will display inefficiencies as the number of parallel processing units grow past approximately 32. Unfortunately, the application of MCSEM methods to large unexplored areas can easily lead to situations where many thousands of simulations of Maxwell's equations must be confronted. A feature of the present invention is to solve this problem in parallel, with each parallel solution itself involving its own separate group of processing units working together in parallel on the assigned solution task. This approach allows the effective application of an almost unlimited number of processing units because the communications required between the separate solutions of Maxwell's equations is extremely sparse in the sense that it occurs only when the solution is complete. For example, analysis of an actual MCSEM dataset required simulation of approximately 256 generating transmitter locations or frequency values per model realization of the dataset. If 32 processing units are assigned to each solution and 1024 CPU's are available, 32 solutions can be obtained at once, so that the entire set of 256 transmitter activations can be acquired (counting two distinct frequencies from the same transmitter location as two activations) in eight solution cycles.

Thus, the specific technical problem solved by the present invention is finding an effective procedure for organization of the computer computations required for the solution of Maxwell's equations in 3D so that CPU's on a high speed computer network may be effectively used in parallel, which means that each CPU is solving its assigned piece of the problem simultaneously with other CPU's in the system. This is done by assigning the available CPU's to locations in a four dimensional ("4D") mesh and by dividing the modeling or inversion tasks associated with distinct transmitter locations, transmitter polarizations, and/or transmitter frequencies among different banks of CPU's. Each one of the CPU banks is viewed as a 3D mesh upon which the actual modeling or inversion domain of the actual data is divided. The use of a 4D mesh of CPU's allows for the effective utilization of many thousands of CPU's without overwhelming the inter-processor communications (also called message passing) capabilities of actual systems. A method for obtaining further computational efficiency by using multiple grids with different mesh spacing is disclosed in companion U.S. Provisional Patent Application No. 60/780,232.

The present invention is a 4D parallelization method for solution and inversion of Maxwell's equations that produces an efficient solution of Maxwell's equations on a large number of processing units (e.g., hundreds to many thousands) operating on an appropriate communications network. 4D Parallelization is achieved by utilization of a four dimensional mapping of the simulation or back projection problem at hand. The spatial or 3D mapping involves assigning portions of the resistivity or conductivity model to specific processing units. Thus, in the above mentioned example of $200^3$ cells along each of X,Y,Z in a Cartesian coordinate system, spatial parallelization on 64 CPU's would assign each sub-domain of $50^3$ cells to each CPU in a regular pattern that places adjacent portions of the model on adjacent CPU's within the communication network to the maximum extent possible. The fourth dimension of parallelization is achieved by solving separate systems of Maxwell's equations in parallel (each solution on a separate group of 64 CPU's). Suppose 64 solutions are carried out in parallel. Then a total of 64×64=4096 CPUs are efficiently deployed in the overall task without excessive communication (and therefore slow effective computation rate) because communication between the 64 parallel solves carried out in the fourth dimension occurs very infrequently. The concept is, of course, independent of the specific decomposition used. The example decomposition is 4 in X, 4 in Y, 4 in Z and 64 in the fourth dimension which in the physical problem corresponds to different generating transmitter location, orientation or frequency. This decomposition is therefore 4×4×4×64=4096 total CPU's deployed. Note that due to the nature of the computations, more intensive communications take place within each set of 4×4×4=64 CPU's that perform each underlying solution of Maxwell's equations.

In preferred embodiments of the invention, emphasis is placed on treating the computational task assigned to each processing unit in a uniform and consistent manner, particularly in regard to the coded programming instructions. This procedure is followed in order to simplify the programming tasks as much as possible and in order to allow the parallel solutions of Maxwell's equations to finish within nearly equally time periods. This is useful particularly in inversion applications where approximately 100 cycles of simulation and background may be needed to drive the numerical optimization process which is used to find a resistivity or conductivity model that matches measured and processed actual data to an acceptable degree. Because of the large number (e.g., thousands) of processing units that will be used in preferred embodiments of the present invention, attention to programming considerations pays extraordinary benefits.

The flow chart of FIG. 1 shows basic steps in one embodiment of the present inventive method. At step 11, CSEM survey data are obtained, decomposed into the frequency domain for selected frequencies of interest. The survey data will comprise many data volumes, each volume corresponding to a certain transmitter (CSEM source) location, a certain frequency, and one of the three orthogonal components of the electric field or the magnetic field (which may for brevity be referred to as the polarization). The fourth dimension in the 4D references in the description of the present invention refers to the particular choice of frequency, transmitter location, and polarization to which a given 3D data volume corresponds. Any one such 3D data volume may be considered to be a slice in this 4D space. At step 11, N of these 4D slices are selected.

At step 12, an initial model of resistivity as a function of subsurface location is generated based on available information. The initial model is decomposed into M partial volumes for each of the N slices. The reason for this is that for each 4D slice of data, M processors will divide up the volume and solve Maxwell's equations in parallel. This requires N banks with M processors per bank, which must be arrayed physically and provided with communication, each bank being programmed to solve Maxwell's equations. (Step 13) All processors in a bank receive the 4D data slice assigned to that bank as input data, and each processor in the bank receives its corresponding partial volume of the initial resistivity model as further input data. (Step 14)

It should be noted that is not necessary for each processor in a bank to receive the entire 4D slice of data, but it can be advantageous because it enables each of the M processors to compute the misfit function without needing another processor to send it the error due to its bit of data. Instead, this could be programmed in a different way: data could be tied to the particular processor within the bank of M processors which has a portion of the 3D subsurface model which contains the location where the data were measured (typically this would be only processors assigned portions of the 3D model containing the water bottom). After solving Maxwell's equations for the assigned 4D data slice collectively across the M tasks, the simulation result would be read out and the contribution to the error misfit would be calculated. To obtain the total error function, a parallel sum across all M tasks would be performed and finally the sum would be broadcasted back to all tasks. That technique may be contrasted with broadcasting all data to all M processors at the beginning and also broadcasting all the simulated data values (one at a time as they are computed) to all processors as well. When finished with the simulation step, each task has all it needs to compute the total error misfit contribution to the data slice. Typically, data volumes are so small relative to the task of the 3D simulation that the extra communication is of no consequence. Other variations to such programming details may occur to the user.

At step 15, Maxwell's equations are the solved in 3D, in parallel, to simulate, i.e., calculate theoretical values of survey data as measured by the survey receivers. It should be noted that two levels of parallel computing are involved. N slices of the fourth dimension are being treated simultaneously, and for each slice, the 3D subsurface volume of interest is divided between M processors working simultaneously. The person of ordinary skill in this technical field will recognize that there is no overriding reason why each bank of CPU's must have the same number of CPU's. Considerations of load balancing and equalizing run times favor using the same number of CPU's in each bank, but the invention is not so limited. In practice, the total number of available CPU's will constrain the problem. The user then decides how to distribute them, i.e., what M and N should best be such that an optimal balance is achieved between solution accuracy and run time and such that (assuming M processors per bank) M×N≦the total number of available CPU's.

At step 16, the simulated data are compared to the measured data. Differences, called residuals, are calculated, and these residuals may be summed across banks to yield a misfit error for the initial resistivity model. At step 17, the misfit error is compared to a pre-selected tolerance or convergence criterion. If the error is within tolerance, the process is concluded; if not, the resistivity model is readjusted at step 18 and the method returns to step 13 and recycles using the updated resistivity model. As previously discussed, the model updating may be performed by user intervention or by an automated inversion procedure. If the number of data slices of interest exceed N, the process is repeated until all slices have been simulated before determining a misfit error and updating the model (not shown in FIG. 1).

Figure 2:
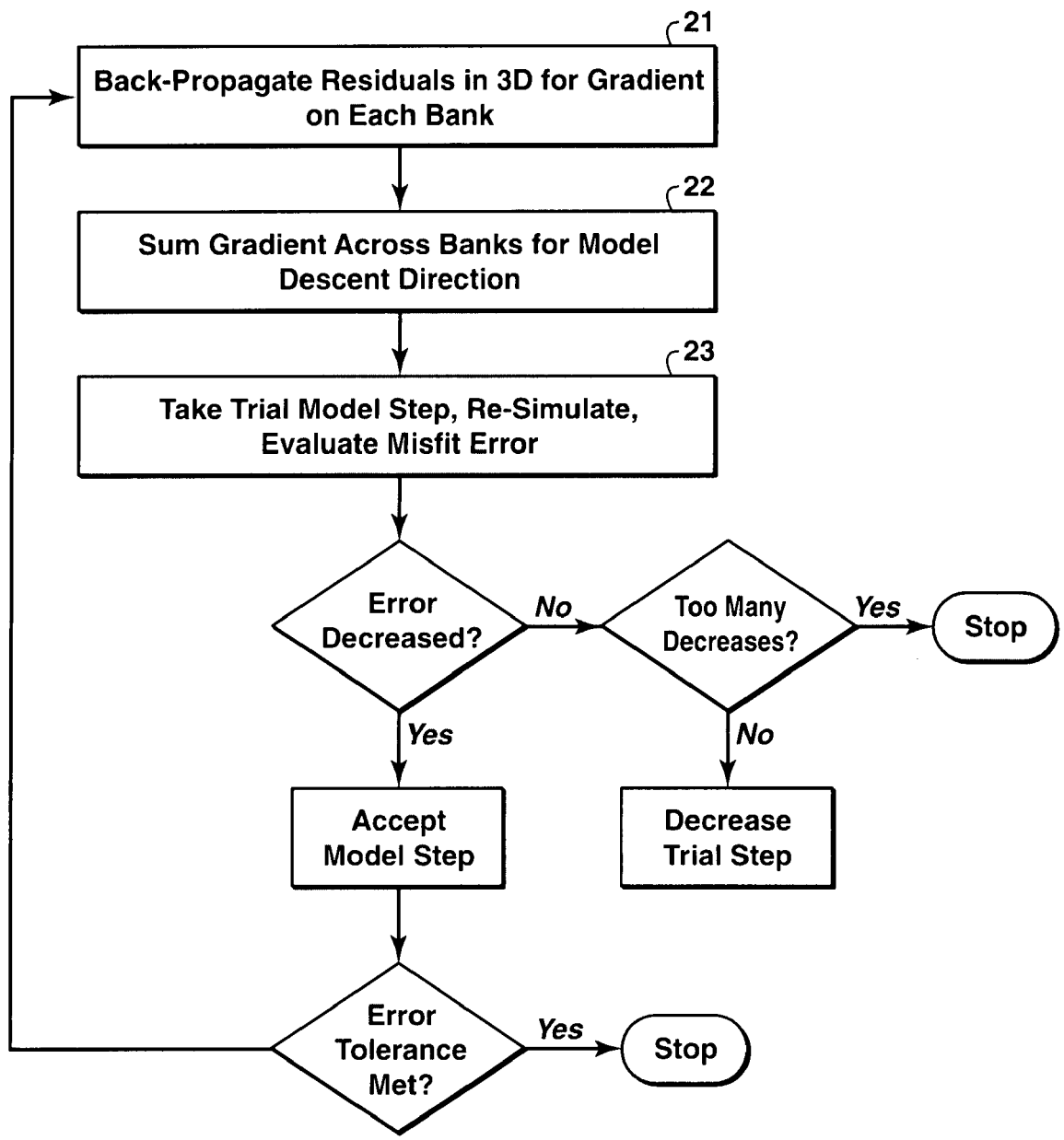
FIG. 2 is a flow chart showing basic steps in a full inversion embodiment of the invention.

A typical automated inversion process is outlined in FIG. 2. (FIG. 2 thus shows one way to update the resistivity model in step 18 of FIG. 1.) At step 21, gradients of the misfit error with respect to the model resistivities (or conductivities) are calculated. This is the process called back-propagation, which provides an efficient method of computing the gradient by solving Maxwell's equations using the residual at each data location as the transmitting source. At step 22, the calculated gradients are summed across banks for a model descent direction. If at a given subsurface 3D model location, the total gradient indicates that the misfit error is decreasing with (for example) increasing resistivity, the model value of resistivity at that location is incremented upward by some trial model step. This is done throughout the model, and at step 23 the data are re-simulated for the trial model step, and the misfit error is reevaluated. The remaining blocks in FIG. 2 indicate how the model step can be evaluated, accepted or refined, or the process can be halted if insufficient improvement appears to be achievable. This process is further described as feature 9 below.

It may be noted that steps 14, 21 and 23 each utilize M×N parallel computation.

An embodiment of the present inventive method may include some or all of the following features.

One CPU is designated as the lead processor. This processor reads in all aspects of the problem to be solved including control information, data to be inverted, initial models, weights, geometry, frequencies etc. If, because of hardware limitations on the amount of available random access memory (RAM), data may placed on the local disk drive of this processing unit.

In addition, the lead processor determines a particular 4D decomposition for solving the given problem on the resources allocated to the task. The 4D decomposition is subject to the following constraints:

a) the number of processors (M) assigned to solve the simulation or back-projection problems must collectively provide enough memory to hold the full (global) subsurface resistivity model in RAM, and b) still, ideally, permit as many (N) parallel simulations and back-projections to occur in parallel as possible given the existing limitation on the number of available processing units (M×N).

Furthermore, the lead processor determines the memory allocation procedure to be used on all CPU's (assumed to be identical in this example) based on the maximum memory requirements of any simulation or back projection problem that will need to be performed.

Problem data, decomposition information and memory allocation are broadcast to the lead processor of each set of CPU's to be used in the parallel solutions of Maxwell's equations. If necessary, data are placed on the local disk drive of these local lead processors.

The problem data, decomposition information and memory allocation information are broadcast from each local lead processor to all the CPU's of its processing group. The transmitter locations, orientations and frequencies assigned to each processing group are assigned just once and remain forever fixed in preferred embodiments of the present invention.

The solution process may begin as follows: each local processor group sets up the required system of equations and applies the selected iterative solution procedure. In general solutions proceeding in parallel on different local processor groups will not achieve acceptable solutions at exactly the same rate. Although this can be due to slightly different computation rates observed even on so-called identical processing units, the major reason that solutions are obtained at different rates is associated with clear physical reasons. These reasons include the fact that a single computation grid will achieve convergence of the numerical solution procedure used to solve Maxwell's equations at different rates for different frequencies. Also a generating transmitter that happens to be located near a strong change in resistivity or conductivity will create a more complicated electric field pattern which will be harder to accurately determine than the electric field pattern produced by a generating transmitter located in a portion of the model exhibiting little variation. For these reasons a number of stopping conditions are employed to end the iterative solution procedure so that sufficiently accurate solutions are obtained without allowing one particularly difficult solution to keep the other resources waiting. This procedure, therefore, enforces synchronization of the local groups of CPU's performing the independent parallel solutions of Maxwell's equations at the point that the final results are collected.

If the objective is a simulation for a by-hand interpretation and adjustment to the assumed resistivity model, the electric field solution results are appropriately interpolated to the exact locations of the requested data on the local lead processors. Finally the entire collection of local lead processors transmits the results back to the global lead task CPU for final reporting.

If the objective is a fully automated inversion, the simulation step is followed by a back projection solution which is used to compute the gradient of the inversion error function with respect to the grid resistivities or conductivities. The contribution of each transmitter location, frequency or orientation to the gradient is summed and the final result is appropriately scaled to produce a candidate update to the resistivity or conductivity model that will reduce the inversion error function. A trust region is estimated and a step size search is used to determine the optimum step in the (negative) gradient direction. Note that the entire resistivity model is preferably updated before another simulation is performed and the process repeated, and that each candidate step involves an entire re-modelization.

Eventually the process terminates (satisfies a convergence criterion or other stopping point) with a suitable interpretation or inversion of the measured and processed MCSEM data. Inversions using the gradient search method outlined above may typically require 50 to 100 cycles of the inversion update process. Preferably, a single. overall cycle stopping time is pre-set to prevent many processors from sitting idle, having converged their iterative process, while a relatively few processors struggle on due to difficult geometrical considerations or other variable factors. Such embodiments reflect a judgment that efficient utilization of a large amount of computing resources is more important than accepting a somewhat greater degree of error in a few computations.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for organizing a plurality of computer processors into a system of parallel processors to invert measured electromagnetic field data from a controlled-source electromagnetic survey of a subsurface region to estimate resistivity structure within the subsurface region, comprising:
   (a) decomposing the measured data into frequency components, and developing an assumed resistivity model of the subsurface region;
   (b) arraying computer processors into N banks, where N>1, each bank containing a plurality of processors, including communication between processors and between banks;
   (c) programming the processors in each bank to solve Maxwell's equations in parallel by an iterative numerical method for solving partial differential equations, each processor solving over a different portion of the volume of the subsurface region;
   (d) inputting to each bank a different slice of the measured data, a different slice being denoted by a different electromagnetic field component, frequency or electromagnetic source location;
   (e) partitioning the resistivity model into partial volumes equal in number to the number of processors in a bank and inputting a different partial volume into each processor, and repeating for each bank;
   (f) solving Maxwell's equations by parallel computation within each bank, thereby simulating theoretical electromagnetic data corresponding to the assumed resistivity model and to the source frequency, location and field component corresponding to the measured data slice associated with the bank, each bank simulating solutions corresponding to different data slices of measured data by parallel computation between banks; and
   (g) comparing the simulated data to the measured data, and adjusting the model to reduce the difference.

2. The method of claim 1, further comprising repeating steps (d)-(f) as necessary until all data slices have been simulated.

3. The method of claim 1, further comprising repeating steps (e)-(g) for the adjusted resistivity model until the difference between the simulated and measured data meets a pre-selected error tolerance or until another stopping point is reached.

4. The method of claim 1, further comprising designating one processor in each bank as local lead processor and connecting an additional processor, called a lead processor, to at least all local lead processors, said lead processor being adapted to serve as a central input location for all problem data and information.

5. The method of claim 4, further comprising programming the lead processor to select which N data slices are selected for loading into the N processor banks, according to criteria including degree of similarity of problems to be solved by the N different processor banks.

6. The method of claim 1, wherein step (g) comprises:
   (g1) computing differences ("residuals") between measured and simulated data at different spatial locations, and summing residuals to obtain an estimate of misfit error for the assumed resistivity model;
   (g2) comparing the misfit error to a pre-selected misfit tolerance; and
   (g3) adjusting the resistivity model to reduce the misfit error if the error is not within the tolerance or if no other stopping condition has been met.

7. The method of claim 6, wherein adjusting the resistivity model to reduce the misfit error in step (g3) comprises:
   (i) back-propagating a plurality of the residuals to determine the gradient of each residual with respect to model resistivity;
   (ii) summing the gradients and determining from the summed gradients at each spatial location a trial change in model resistivity at that location to reduce the residual, thereby generating an adjusted model; and
   (iii) resimulating using the adjusted model and repeating steps (g1) to (g3).

8. The method of claim 6, wherein step (g3) is performed using manual operator intervention.

9. The method of claim 6, wherein step (g3) is performed by a programmed optimization procedure, said optimization procedure involving calculating derivatives of misfit error with respect to resistivity, thereby generating an optimized update to the resistivity model.

10. The method of claim 1, wherein step (g) is performed using manual operator intervention.

11. The method of claim 1, wherein partitioning of the resistivity model in 3D (x,y,z) space into M partial volumes is performed by setting $M=m^3$, where m is a selected integer, and defining each partial data volume to have dimensions X/m by Y/m by Z/m, where the 3D data volume representing the subsurface region has spatial dimensions X by Y by Z.

12. The method of claim 1, wherein the numerical method for solving partial differential equations is a finite difference method.

13. The method of claim 1, wherein decomposing the measured data into frequency components is performed by Fourier transformation of the measured data, and frequency components of the data are selected for further processing based on their associated electromagnetic field data amplitudes.

14. The method of claim 1, further comprising arranging the processors in a processor bank in close physical proximity to each other so as to minimize length of communication wires connecting the processors to each other.

15. The method of claim 1, further comprising setting a time limit at which time computation in all processors is terminated (end of parallel computation cycle) whether a pre-selected convergence criterion has been reached or not.

16. The method of claim 1, further comprising downloading the adjusted resistivity model from (g) or saving it to computer memory or other data storage.

17. A method for producing hydrocarbons from a subsurface region, comprising:
   (a) performing a controlled source electromagnetic survey of the subsurface region;
   (b) obtaining results of inverting electromagnetic data measured in the survey to obtain a resistivity model of the subsurface region, said inversion having been performed by steps comprising:
      decomposing the measured data into frequency components, and developing an assumed resistivity model of the subsurface region;
      arraying computer processors into N banks, each bank containing a plurality of processors, including communication between processors and between banks;
      programming the processors in each bank to solve Maxwell's equations in parallel by an iterative numerical method for solving partial differential equations, each processor solving over a different portion of the volume of the subsurface region;
      inputting to each bank a different slice of the measured data, a different slice being denoted by a different electromagnetic field component, frequency or electromagnetic source location;
      partitioning the resistivity model into partial volumes equal in number to the number of processors in a bank and inputting a different partial volume into each processor, and repeating for each bank;
      solving Maxwell's equations by parallel computation in each bank, thereby simulating theoretical electromagnetic data corresponding to the assumed resistivity model and to the source frequency, location and field component corresponding to the data slice associated with the bank; and
      comparing the simulated data to the measured data, and adjusting the model to reduce the difference;
   (c) identifying a resistivity anomaly in the adjusted resistivity model indicative of presence of hydrocarbons, and drilling a well into the layer exhibiting the anomaly; and
   (d) producing hydrocarbons from the well.

18. A method for organizing a plurality of computer processors into a system of parallel processors to invert measured electromagnetic field data from a controlled-source electromagnetic survey of a subsurface region to estimate resistivity structure within the subsurface region, comprising:
   inverting the measured data, after decomposition to the frequency domain, to adjust an assumed resistivity model of the subsurface region, said inversion being performed by iteratively solving Maxwell's electromagnetic field equations and comparing to the measured data, wherein the solutions to Maxwell's equations are performed in parallel on multiple processors for one slice of the data while other processors are performing the same task in parallel on one or more different slices of the data, a slice being characterized by its electromagnetic field component, or its frequency, or its electromagnetic source location.

* * * * *